United States Patent [19]

Sakurai et al.

[11] Patent Number: 4,588,647
[45] Date of Patent: May 13, 1986

[54] PERPENDICULAR MAGNETIZATION FILM AND THE PREPARATION THEREOF

[75] Inventors: Yoshifumi Sakurai, Mino; Takuhisa Numata, Hirakata; Kazuo Saito, Takarazuka; Koji Saiki, Toyonaka, all of Japan

[73] Assignee: Kanegafuchi Kagaku Kogyo Kabushiki Kaisha, Osaka, Japan

[21] Appl. No.: 780,515

[22] Filed: Sep. 26, 1985

[30] Foreign Application Priority Data

Sep. 27, 1984 [JP] Japan ................................ 58-202196

[51] Int. Cl.⁴ ............................................. H01F 10/02
[52] U.S. Cl. .................................... 428/457; 427/128; 427/250; 427/294; 428/694; 428/900
[58] Field of Search ................ 427/250, 132, 294; 428/457, 694, 900

[56] References Cited

U.S. PATENT DOCUMENTS 4,548,864 10/1985 Nakayama et al. ................. 428/900

OTHER PUBLICATIONS

S. Iwasaki et al: "Co-Cr Recording Films With Perpendicular Magnetic Anisotropy", IEEE Transactions on Magnetics, vol. Mag-14, No. 5, Sep. 1978.

K. Tsutsumi et al: "Fe-Nd-Ti Films With Perpendicular Magnetic Anisotropy", Japanese Journal of Applied Physics, vol. 23, No. 3, Mar., 1984, pp. L 169 to L 171.

Primary Examiner—Bernard D. Pianalto
Attorney, Agent, or Firm—Armstrong, Nikaido, Marmelstein & Kubovcik

[57] ABSTRACT

A perpendicular magnetization film of iron-chromium alloy having an easy magnetization axis perpendicular to a plane of substrate, and the preparation thereof. The perpendicular magnetization film provides a dominant peak corresponding to a lattice constant of 2.07 to 2.08 Å in X-ray diffraction spectrum, and possesses a large saturation magnetization of more than 100 emu/cm³. The perpendicular thin film can be prepared by depositing iron and chromium on the substrate under vacuum or an atmosphere of argon gas at a low pressure.

4 Claims, 5 Drawing Figures diffraction angle 2θ (deg.)

PERPENDICULAR MAGNETIZATION FILM AND THE PREPARATION THEREOF

BACKGROUND OF THE INVENTION

The present invention relates to a perpendicular magnetization film used as a perpendicular magnetic storage medium which is suitable for high-density recording, and the preparation thereof.

For a high-density magnetic storage, a perpendicular magnetic storage medium is effectively used. A magnetic storage medium used for such a purpose is prepared by the use of magnetic thin film which has an easy magnetization axis perpendicular to a plane of film. For perpendicular magnetic storage, there have been researched a magnetic storage of cobalt-chromium alloy prepared by means of sputtering or vacuum-evaporation method, and also a magnetic storage of barium-ferrite alloy prepared by means of coating or sputtering method. For applying cobalt-chromium thin film to a perpendicular magnetic storage, a structure of single crystal or a structure close to single crystal must be provided. In a process of preparing an alloy having the above structure, a substrate needs to be heated to a temperature of more than 100° C. or in some cases to a temperature of more than 200° C. On the other hand, for applying barium-ferrite thin film to a perpendicular magnetic storage by means of coating method, a barium and ferrite powder consisting of uniform particles of about 0.1 μm in diameter must be provided. It costs much to produce such barium and ferrite powder. Moreover, it is necessary to mix a binder to form a film. In a film containing such a binder, a saturation magnetization becomes smaller depending on a content of a binder, so that capacity of magnetic storage is decreased. In a process of preparing a barium-ferrite film by means of sputtering method, a substrate needs to be heated to a temperature of about 500° C. Thus, a substrate of cheap plastic materials cannot be used.

An object of the present invention is to solve the problem that an ordinary plastic material cannot be used for a substrate of a perpendicular magnetic storage of cobalt and chromium, and that a material of substrate is restricted within expensive polyimides, aluminum, glass, or the like because a substrate must be heated to a temperature of more than 100° C. in a process of preparation thereof. Another object of the invention is to solve the problem that cobalt is rare and expensive resources. Still another object of the invention is to solve the problem that a perpendicular magnetic storage of barium-ferrite alloy has low saturation magnetization compared with cobalt-chromium alloy.

The above and other objects and the advantages of the present invention will become apparent from the following description.

SUMMARY OF THE INVENTION

These objects of the invention are solved by providing a perpendicular magnetization film comprising a magnetic thin film of iron-chromium alloy, and also providing the preparation thereof. The film is supported on a substrate and has an easy magnetization axis perpendicular to a plane of substrate. The alloy contains chromium in an amount of 20 to 60 atomic %. The process for preparing the perpendicular magnetization film comprises depositing iron and chromium on the substrate under vacuum or atmosphere of argon gas at a low pressure.

DETAILED DESCRIPTION OF THE INVENTION

Figure 1:
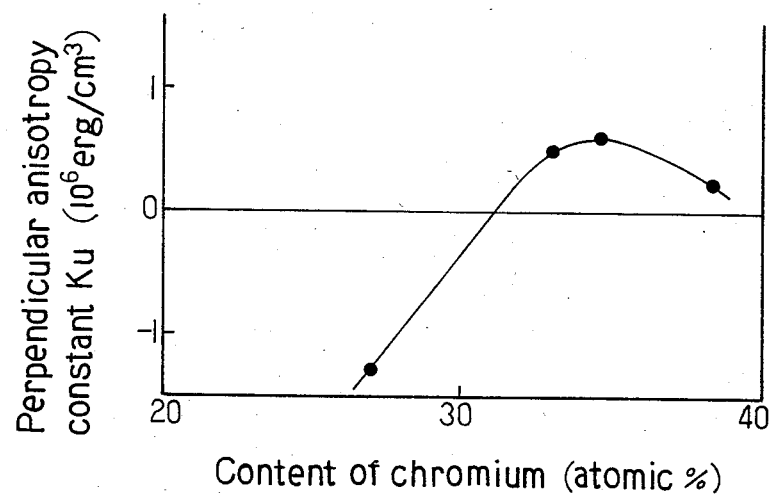
FIG. 1 is a graph showing a relationship between a concentration of chromium and perpendicular anisotropy constant Ku of a magnetic thin film of iron-chromium alloy prepared by means of sputtering-evaporation.

In the present invention, a magnetic thin film supported on a substrate is composed of chromium and iron wherein a content of chromium is 20 to 60 atomic %, preferably 30 to 50 atomic %, and a magnetic thin film possesses an easy magnetization axis perpendicular to a plane of substrate.

When a content of chromium is less than 20% in the alloy, a crystal phase rich in iron is deposited on a substrate, and a film does not represent a perpendicular uniaxial anisotropy, and accordingly, a perpendicular anisotropy of a magnetic thin film is not present because of an existence of a strong demagnetizing field which is induced by a large saturation magnetization of the film.

A thickness of a magnetic thin film is preferably 100 to 10,000 Å, and most preferably 500 to 5000 Å. When the thickness of the film is below 100 Å, a leakage flux is so small that a sensitivity for reading out the written informations is low. On the other hand, when the thickness is more than 10,000 Å, it will be difficult to write down the informations throughout a thickness of film. Thus, using a film of more than 10,000 Å results in a waste of material and cost.

The magnetic thin film of the invention is corrosion resistant because it contains much chromium.

To achieve the object of the invention, it is preferable that a magnetic film of iron-chromium alloy has present only a peak corresponding to a lattice constant at 2.07 to 2.08 Å in a X-ray diffraction spectrum. Such a magnetic film having the above-mentioned peak represents a large perpendicular magnetic anisotropy. At present, the crystal structure from which this diffraction peak originates is unknown. In a magnetic film which represents a peak at about 2.04 Å in a diffraction spectrum corresponding to a 110-plane of iron in a body-centered cubic structure, a perpendicular magnetic anisotropy of the film contrarily tends to be small. In the invention, a magnetic thin film having a dominant peak corresponding to a range of 2.07 to 2.08 Å of lattice spacing is preferably used.

When a magnetization in a direction perpendicular to a plane of substrate is more intense than a magnetization of any other direction of magnetization, a magnetic thin film is hereinafter referred to that the film has an easy magnetization axis perpendicular to a plane of substrate. That is to say, a residual magnetization determined from a magnetization-hysterisis curve along a direction perpendicular to a plane of substrate is large compared with residual magnetization in any other direction within a surface of substrate.

Examples of substrates in the invention are a metal plate of aluminum or stainless steel, a sheet or film of polyesters, polyimides or polymethacrylates, and the like. A material of a substrate is not restricted within the above-mentioned, but the material must have a softening point of more than about 50° C. and a thickness in a range of about 10 μm to about 10 mm.

A perpendicular magnetization film of the invention can be deposited by means of evaporation method such as sputtering or vacuum-evaporation.

A process for preparing a perpendicular magnetization film by means of sputtering is disclosed in the following description. For allowing a magnetic thin film of iron and chromium to have perpendicular magnetic anisotropy, necessary conditions to be suitably decided in a sputtering process include a composition of alloy or content of chromium, a temperature of substrate, a rate of deposition, and a pressure of atmospheric argon gas. A content of chromium in the alloy is 20 to 60 atomic %, and preferably 30 to 50 atomic %. A perpendicular magnetization film of the invention is obtained by setting up a temperature of substrate, rate of sputtering and pressure of argon gas. Preferably, a structure of deposited film should be determined so that a diffraction peak corresponding to a lattice constant of 2.07 to 2.08 Å becomes dominant in a X-ray diffraction spectrum. An upper limit of the range of a permitted temperature of substrate is decided according to a softening point of substrate. Preferably, a temperature of substrate is low so as to obtain a crystal structure having a lattice constant of 2.07 to 2.08 Å of a perpendicular magnetic film. In this regard, a substrate should be cooled below room temperature with coolant such as water in a sputtering process. Usually, a temperature of substrate is selected in a range of about $-50°$ to about 150° C., preferably 0° to 80° C., most preferably 0° to 50° C. A rate of sputtering is changed by adjusting a supplied power to a sputtering apparatus. When a power for sputtering is high, a deposition rate of magnetic film becomes high, and also a temperature of surface of substrate rises. Thus, a substrate should be cooled when a power of sputtering is large. A pressure of argon gas is usually set in a range of $1 \times 10^{-3}$ to $1 \times 10^{-2}$ Torr.

A mangetic thin film produced in the aforementioned conditions shows a crystal structure having a lattice constant of 2.07 to 2.08 Å. The fact is judged from X-ray diffraction analysis. The surface of the obtained magnetic thin film might be equal to a 110-plane of a body-centered cubic structure of chromium-rich iron, but the above fact cannot be concluded at present.

Examples of sputtering apparatuses used to prepare a magnetic thin film of the invention are DC (direct current)-sputtering apparatus, RF (radio frequency)-sputtering apparatus or ion-beam sputtering apparatus, and the like. In a magnetic thin film prepared by the aforementioned process, a perpendicular mangetic anisotropy constant Ku is positive and more than $10^5$ erg/cm$^3$, a coercive force is more than 300 oersted (Oe), so that the obtained magnetic thin film is a perpendicular magnetization film.

Another process for preparing a perpendicular magnetization film of the invention by means of vacuum-evaporation is disclosed in the following description. Examples of vacuum-evaporation processes which can be applied to the invention are resistive-heating-evaporation, electron-beam-heating-evaporation, and the like.

For preparing a perpendicular magnetization film of iron-chromium alloy, conditions to be controlled in the process of vacuum-evaporation method essentially include a component of film and a temperature of substrate. Concentration of chromium in the alloy is 20 to 60 atomic % and preferably, 30 to 50 atomic % to obtain a perpendicular magnetization film. An evaporation can be performed either by evaporating iron and chromium, respectively, or by evaporating an alloy of iron and chromium including an amount of 20 to 50 atomic % of chromium. Evaporation of an alloy of iron an chromium can be suitably accomplished by reason that a vapor pressure of iron and a vapor pressure of chromium are not so different from each other. In a vacuum-evaporation process, a temperature of substrate is unavoidably increased by a radiation of heat from an evaporator, and a substrate should be cooled to a temperature in a range of about 0° to about 100° C., preferably 0° to 80° C., and most preferably 0° to 50° C.

In the above conditions of vacuum-evaporation, the obtained magnetic film possesses a perpendicular magnetic anisotropy Ku of more than $10^5$ erg/cm$^3$. This value of Ku is nearly the same as in the case of sputtering-evaporation.

A magnetic thin film prepared by the above-described processes has a large saturation magnetization, a large vertical magnetic anisotropy, and a large coersive force. Those magnetic properties are suitable as a perpendcular magnetic storge for recording high-density information.

A suitably prepared example of magnetic thin film which is deposited by means of sputtering-evaporation method under the following conditions, i.e. concentration of chromium of 35 atomic %, deposition rate of 150 Å/min, and pressure of argon gas of $1.5 \times 10^{-3}$ Torr, realizes a perpendicular magnetization film of iron-chromium alloy in a thickness of 4,000 Å having a perpendicular magnetic anisotropy constant Ku of more than $5 \times 10^5$ erg/cm$^3$, and coersive force Hc$_\perp$ of more than 500 Oe. A perpendicular magnetic anisotropy constant Ku is derived from the relationship: $Ku = K_\perp + 2\pi Ms^2$, where $K_\perp$ is an apparent uniaxial anisotropy constant measured by a torque meter, and Ms is a saturation magnetization. Hc$_\perp$ is defined as a coersive force decided from a magnetization curve measured by applying a magnetic field perpendicular to a plane of substrate.

At present, it is not known why the perpendicular magnetic thin film of iron-chromium alloy of the invention possesses a large perpendicular magnetic anisotropy and a large coercive force.

It is reported, for example, by Shunichi Iwasaki in Nikkei Electronics, Oct., infra p. 141 (1982) that a magnetic thin film having a large perpendicular anisotropy can be suitably used for high-density recording. It is a matter of course that the perpendicular magnetization film of iron-chromium alloy of the invention can be used for recording high-density information.

A perpendicular magnetization film in the present invention and its preparation are experimentally explained by the following Examples. It is to be understood that the present invention is not limited to Examples, and various changes and modifications may be made in the invention without departing from the spirit and scope thereof.

EXAMPLES 1 TO 3

Magnetic thin films of iron-chromium alloy were deposited on the glass-substrate of 1 mm in thickness by means of rf-magnetron sputtering apparatus. The target was an iron plate of a diameter of 3 inches and a thickness of 0.5 mm. Chromium chips of 10 mm square were put on the iron plate. The concentration of chromium in the film was controlled by changing the number of chromium chips. The distance between the substrate and the target was 5 cm. The pressure of argon gas was $1.5 \times 10^{-3}$ Torr. The temperature of the substrate was room temperature. The supplied power for sputtering was 50 W. Prior to the deposition, a sputtering was performed to clean the surface of target. After the above process was completed, the substrate was exposed to the target by opening the shutter. Thereafter the magnetic film was deposited on the substrate for 30 minutes.

The thickness of the obtained magnetic thin film was measured by means of stylus step monitor. The composition of the film was measured by means of X-ray analyzer. The saturation magnetization Ms was measured by means of vibrating-sample-magnetometer. The apparent uniaxial magnetic anisotropy constant $K_\perp$ perpendicular to the substrate was measured by a torque meter. The perpendicular magnetic anisotropy constant Ku was derived from the relationship: $Ku = K_\perp + 2\pi Ms^2$.

Figure 3:
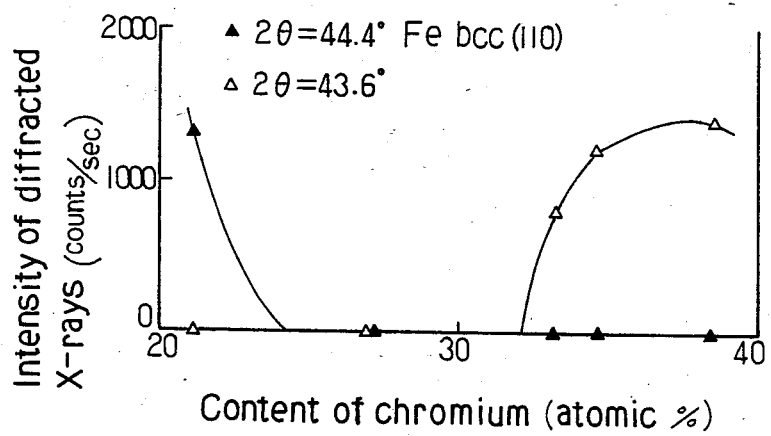
FIG. 3 is a graph showing a relationship between an intensity of peak in a X-ray diffraction spectrum and a concentration of chromium in a magnetic thin film of iron-chromium alloy prepared by means of sputtering-evaporation.
Figure 2A:
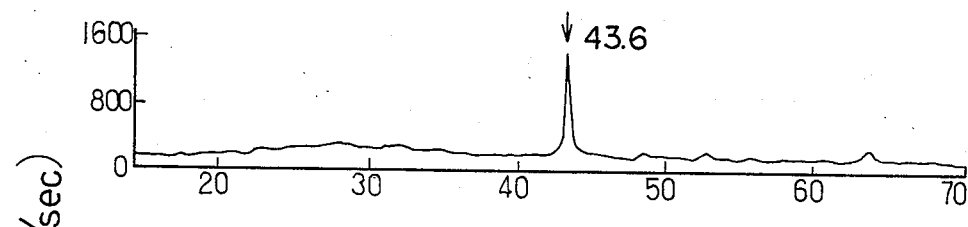
FIGS. 2A to 2C are charts of measured X-ray diffraction of a magnetic thin film of iron-chromium alloy prepared by means of sputtering-evaporation.

The results are shown in Table 1 and FIG. 1, wherein Ku changes in accordance with the variation of content of chromium in the film. The X-ray diffraction spectrum of the magnetic thin film obtained in the process of Example 2 is plotted in the graph of FIG. 2A. FIG. 3 is a graph illustrating a variance of intensity of diffracted X-rays versus a content of chromium where the diffraction angles $2\theta$ were 44.4° and 43.6°, respectively. In the above measurement, the copper anode was used under an accelerating voltage of 30 kV and emission current of 50 m A. The power for sputtering was 50 W.

COMPARATIVE EXAMPLES 1 AND 2

Figure 2B:
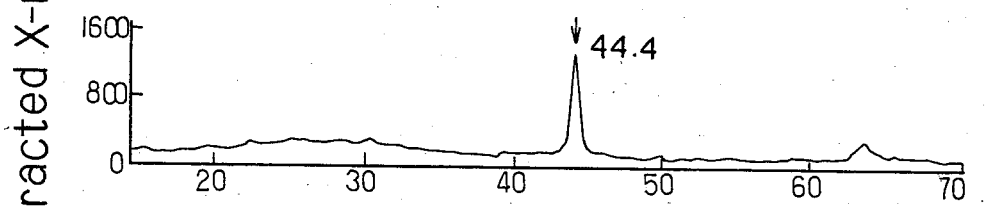

Magnetic thin films containing a smaller amount of chromium were prepared under the same condition as in Example 1. Magnetic properties of the obtained magnetic thin films were measured. The results are shown in Table 1 and FIG. 1. The X-ray diffraction spectrum of the magnetic thin film prepared in the process of Comparative Example 1 is plotted in the graph of FIG. 2B. A variance of intensity of diffracted X-rays versus a content of chromium are plotted in the graph of FIG. 3, wherein the diffraction angles $2\theta$ were 44.4° and 43.6°, respectively. From the results of Table 1 and FIG. 1, it is seen that a perpendicular magnetization film cannot be obtained where a content of chromium is small. From the results of FIG. 3, it is seen that the peak of X-ray diffraction spectrum at an angle of $2\theta = 44.4°$ (corresponding to a 110-plane of a body-centered cubic structure of Fe) is not recognized, but the peak at an angle of $2\theta = 43.6°$ appears in the magnetic thin films which have a large amount of perpendicular magnetic anisotropy.

COMPARATIVE EXAMPLES 3 TO 6

Figure 2C:
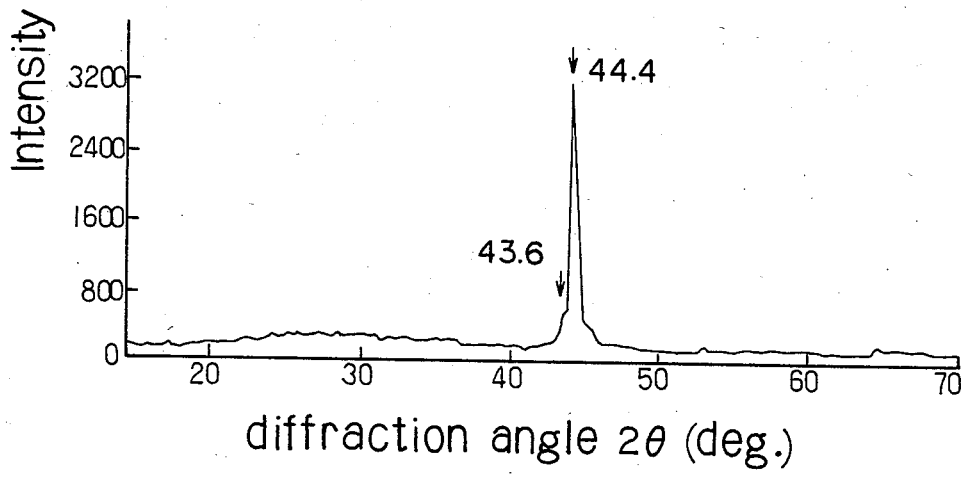

Magnetic thin films were prepared in the same condition as in Example 2 except that the temperatures of the substrate were different from the temperatures in Example 2. The magnetic properties of the obtained magnetic films were measured in the same manner as in Example 1. The results are shown in Table 1. The X-ray diffraction spectrum of the obtained magnetic thin film in Comparative Example 6 is plotted in the graph of FIG. 2C. From the results of Table 1 and the graph of FIG. 2C, it is seen that the oriented 110-plane of the body-centered cubic structure of Fe was deposited on the substrate at a high temperature, and the perpendicular magnetic anisotropy is vanishing.

EXAMPLES 4 AND 5

Magnetic thin films were prepared under the same condition as in Example 2 except that the supplied powers for sputtering or deposition rates were different from Examples 1 to 3. The measured magnetic properties of the obtained magnetic thin films are shown in Table 1. The powers for sputtering were 150 W in Example 4 and 300 W in Example 5, respectively.

EXAMPLE 6

A magnetic thin film was deposited on the substrate under the same condition as in Example 2 except that the substrate was a film of polyethylene terephthalate of 76 μm thick, and the substrate was cooled to a temperature of 20° C. and the supplied power for sputtering was 200 W. In the obtained magnetic thin film, the concentration of chromium was 34.2 atomic %, saturation magnetization was 250 emu/cm$^3$, perpendicular magnetic anisotropy constant was $5.2 \times 10^5$ erg/cm$^3$ and coersive force was 560 Oe. The curl of the plane of substrate was not actually recognized. In X-ray diffraction analysis, only a diffraction peak corresponding to a lattice constant of 2.074 Å was recognized.

TABLE 1

|  | Concentration of chromium atomic % | Temperature of substrate °C. | Pressure of argon gas Torr. | Deposition rate Å/min | Saturation magnetization Ms emu/cm$^3$ | Coersive force Hc$_\perp$ Oe | Perpendicular anisotropy constant Ku erg/cm$^3$ |
|---|---|---|---|---|---|---|---|
| Ex. 1 | 33.0 | room temp. | $1.5 \times 10^{-3}$ | 150 | 260 | 620 | $+0.5 \times 10^6$ |
| Ex. 2 | 34.5 | " | $1.5 \times 10^{-3}$ | 130 | 280 | 600 | $+0.6 \times 10^6$ |
| Ex. 3 | 38.3 | " | $1.5 \times 10^{-3}$ | 130 | 100 | 680 | $+0.22 \times 10^6$ |
| Com. Ex. 1 | 21.0 | " | $1.5 \times 10^{-3}$ | 130 | 1470 | 400 | $< -2 \times 10^6$ |
| Com. Ex. 2 | 27.0 | " | $1.5 \times 10^{-3}$ | 140 | 780 | 500 | $-1.3 \times 10^6$ |
| Com. Ex. 3 | 35.5 | 100 | $1.5 \times 10^{-3}$ | 130 | 300 | 380 | $-0.43 \times 10^6$ |
| Com. Ex. 4 | 32.8 | 150 | $1.5 \times 10^{-3}$ | 140 | 910 | 320 | $-0.07 \times 10^6$ |
| Com. Ex. 5 | 33.3 | 200 | $1.5 \times 10^{-3}$ | 140 | 840 | 280 | $-0.78 \times 10^6$ |
| Com. Ex. 6 | 35.2 | 250 | $1.5 \times 10^{-3}$ | 160 | 610 | 270 | $-0.49 \times 10^6$ |
| Ex. 4 | 34.7 | room temp. | $1.5 \times 10^{-3}$ | 470 | 270 | 370 | $+0.29 \times 10^6$ |

TABLE 1-continued

| | Concentration of chromium atomic % | Temperature of substrate °C. | Pressure of argon gas Torr. | Deposition rate Å/min | Saturation magnetization Ms emu/cm$^3$ | Coersive force Hc$_\perp$ Oe | Perpendicular anisotropy constant Ku erg/cm$^3$ |
|---|---|---|---|---|---|---|---|
| Ex. 5 | 33.5 | " | $1.5 \times 10^{-3}$ | 1,000 | 160 | 370 | $+0.11 \times 10^6$ |

According to the present invention, there is provided a perpendicular magnetization film of iron-chromium alloy. The perpendicular magnetization film makes it possible to realize a corossive resistant and high-density magnetic storage at a low cost. In the process for preparing the perpendicular magnetization film, a deposition of the film is carried out at a low temperature of substrate, thereby a cheap material of low heat-resistance can be used for a substrate.

What we claim is:

1. A perpendicular magnetization film comprising a magnetic thin film of iron-chromium alloy and a substrate; said magnetic thin film being supported on the substrate and having an easy magnetization axis perpendicular to the plane of substrate, and said alloy containing 20 to 60 atomic % of chromium.

2. The perpendicular magnetization film of claim 1, wherein said magnetic thin film has a peak corresponding to a lattice constant of 2.07 to 2.08 Å in X-ray diffraction spectrum, with said peak being a relatively dominant peak as compared with the other peaks.

3. The perpendicular magnetization film of claim 1, wherein a saturation magnetization of said magnetic thin film is more than 100 emu/cm$^3$.

4. A process for preparing a perpendicular magnetization film comprising a magnetic thin film of iron-chromium alloy and a substrate; said magnetic thin film being supported on the substrate and having an easy magnetization axis perpendicular to the plane of substrate, and said alloy containing 20 to 60 atomic % of chromium, which comprises depositing iron and chromium on the substrate under vacuum or an atmosphere of argon gas at a low pressure.

* * * * *